(12) United States Patent
Ravi Kumar et al.

(10) Patent No.: US 12,711,791 B2
(45) Date of Patent: Aug. 18, 2026

(54) CROSS-MODAL DENSE SEMANTIC LABEL GENERATION BY DIFFUSION AND ITERATIVE INPAINTING

(71) Applicant: QUALCOMM Incorporated, San Diego, CA (US)

(72) Inventors: Varun Ravi Kumar, San Diego, CA (US); Balaji Shankar Balachandran, San Diego, CA (US); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 305 days.

(21) Appl. No.: 18/532,564

(22) Filed: Dec. 7, 2023

(65) Prior Publication Data

US 2025/0191392 A1 Jun. 12, 2025

(51) Int. Cl.

| | |
|---|---|
| ***G06V 20/70*** | (2022.01) |
| ***G06T 5/77*** | (2024.01) |
| ***G06T 7/12*** | (2017.01) |
| ***G06T 7/162*** | (2017.01) |
| ***G06T 11/26*** | (2026.01) |
| ***G06V 20/56*** | (2022.01) |

(52) U.S. Cl.

CPC ................ *G06V 20/70* (2022.01); *G06T 5/77* (2024.01); *G06T 7/12* (2017.01); *G06T 11/26* (2026.01); *G06V 20/56* (2022.01); *G06V 2201/07* (2022.01)

(58) Field of Classification Search

CPC ......... G06T 11/206; G06T 2207/10024; G06T 2207/10028; G06T 2207/20072; G06T 2207/30252; G06T 5/77; G06T 7/12; G06T 7/162; G06V 20/56; G06V 20/70; G06V 2201/07

See application file for complete search history.

(56) References Cited

U.S. PATENT DOCUMENTS

| | | | | |
|---|---|---|---|---|
| 11,693,101 | B1 * | 7/2023 | An | G01S 17/89 356/5.01 |
| 2008/0242419 | A1 * | 10/2008 | Rieman | A63F 13/847 463/42 |
| 2018/0365835 | A1 * | 12/2018 | Yan | G06T 7/143 |
| 2020/0026283 | A1 * | 1/2020 | Barnes | B60W 60/0016 |
| 2020/0242774 | A1 * | 7/2020 | Park | G06T 7/11 |
| 2022/0036563 | A1 * | 2/2022 | Beltrand | G06T 7/12 |

(Continued)

OTHER PUBLICATIONS

Barnes C., et al., "PatchMatch: A Randomized Correspondence Algorithm for Structural Image Editing", ACM Transactions on Graphics, vol. 28, No. 3, Article 24, Aug. 2009, pp. 1-11.

*Primary Examiner* — Chineyere Wills-Burns

(74) *Attorney, Agent, or Firm* — Shumaker & Sieffert, P. A.

(57) ABSTRACT

Generating dense semantic labels for objects in a camera image may be accomplished by constructing an image graph where nodes of the image graph represent pixels of a camera image; performing a first diffusion of labels on the image graph using sparse labels from a point cloud sensor to generate propagated labels; applying inpainting to one or more regions of the camera image to generate inpainted labels; performing a second diffusion of labels on the image graph to update the propagated labels; and fusing the propagated labels and the inpainted labels.

14 Claims, 5 Drawing Sheets

(56) References Cited

U.S. PATENT DOCUMENTS

2022/0139094 A1* 5/2022 Yoshimi .................. G06T 7/174
382/173
2022/0172464 A1* 6/2022 Ross .................... G05D 1/0044
2022/0306152 A1* 9/2022 Zhang ............... B60W 60/0017
2025/0029386 A1* 1/2025 Lee ........................ G06V 20/48
2025/0054115 A1* 2/2025 Lin ........................... G06T 7/11

* cited by examiner

CROSS-MODAL DENSE SEMANTIC LABEL GENERATION BY DIFFUSION AND ITERATIVE INPAINTING

TECHNICAL FIELD

This disclosure relates to image processing.

BACKGROUND

Autonomous vehicles and semi-autonomous vehicles may use artificial intelligence (AI) and machine learning (ML) models (e.g., deep neural networks (DNNs)) for performing various operations for operating, piloting, and navigating the vehicles. For example, DNNs may be used for object detection, lane and road boundary detection, safety analysis, drivable free-space analysis, control generation during vehicle maneuvers, and/or other operations. DNN-powered autonomous and semi-autonomous vehicles should be able to respond properly to an incredibly diverse set of situations, including interactions with emergency vehicles, pedestrians, animals, and a virtually infinite number of other obstacles.

For autonomous vehicles to achieve autonomous driving levels 3-5 (e.g., conditional automation (Level 3), high automation (Level 4), and full automation (Level 5)) the autonomous vehicles should be capable of operating safely in all environments, and without the requirement for human intervention when potentially unsafe situations present themselves. An advanced driver assistance system (ADAS) uses sensors and software to help vehicles avoid hazardous situations to ensure safety and reliability.

When preparing training data for ML models in ADAS or other applications, labeling multi-sensor image data (for autonomous driving or other applications) is a demanding and time-consuming task due to its labor-intensive nature. In response, methods for automatic semantic label generation for images are being developed using multiple modes of sensor inputs. Some existing automated labeling efforts for object detection in images have focused on annotating three-dimensional (3D) bounding boxes in camera images through cross-sensor projection techniques within a Light Detection and Ranging (LIDAR) frame. However, automatic semantic label generation poses additional challenges for multimodal perception. LIDAR point cloud labels are inherently sparse, lacking the necessary coverage for performance of precise segmentation tasks. The sparsity of labels in the LIDAR point cloud introduces complexities in automatic semantic label generation of images.

SUMMARY

This disclosure describes techniques that apply graph-based diffusion and iterative inpainting operations to propagate sparse point cloud (e.g., LIDAR) annotations to dense semantic segmentation labels for a camera image. Iterative refinement and confidence-weighted fusion of propagation and inpainting improves coherence and accuracy of image processing. Dense semantic segmentation refers to assigning a semantic label (such as "car", "road", "person" etc.) to every pixel in an image. This results in a dense classification of the image into different semantic categories. In the context of labeling data for autonomous driving, dense semantic segmentation aims to categorize every pixel of a camera image into different semantic classes like cars, roads, traffic signs, pedestrians etc.

An image graph is constructed where each node represents a pixel in the camera image. Neighboring pixels are connected using image graph edges and weights are assigned to the pixels based at least in part on the proximity or visual similarity of the pixels. An initial diffusion of labels on the image graph is performed using the sparse labels from the point cloud (e.g., LIDAR) sensor as seed values. This initial diffusion propagates labels of objects through the image graph edges and estimates confidence values for the propagated labels. Missing labels of the image graph are inpainted using labels with high confidence values. Inpainting fills in missing or unlabeled regions in the image to complete semantic segmentation labels where projected LIDAR annotations are sparse. Inpainting propagates available semantic information from neighboring pixels into missing areas based on visual context and continuity. Inpainting enables overcoming sparsity and generating full resolution semantic maps from sparse LIDAR data.

A subsequent diffusion of labels on the image graph is performed. If a convergence of the labels has not yet been achieved, the inpainting operations and diffusion operations are repeated. If a convergence of the labels has been achieved, the propagated labels and inpainted labels are fused, based at least in part on the confidence values of the labels, into dense semantic labels. Convergence refers to the iterative labeling process reaching a stable state where label values do not significantly change between refinement iterations. Convergence may be formally defined based on metrics like change in labels falling below a threshold. Convergence indicates the iterative refinement has optimized the segmentation masks to a coherent and accurate state.

The dense semantic labels may then be used in ADAS or other computer vision applications such as autonomous platforms (e.g., drones, robots), medical image diagnosis, aerial imagery processing, geo-sensing, precision agriculture, etc. The techniques described herein may be repeated for a series of images from a camera.

In an aspect, a method includes constructing, by a computing system, an image graph where nodes of the image graph represent pixels of a camera image; performing a first diffusion of labels on the image graph using sparse labels from a point cloud sensor to generate propagated labels; applying inpainting to one or more regions of the camera image to generate inpainted labels; performing a second diffusion of labels on the image graph to update the propagated labels; and fusing the propagated labels and the inpainted labels to generate dense semantic labels for the camera image.

In another aspect, an apparatus includes a memory that stores instructions; and processing circuitry that executes the instructions to construct an image graph where nodes of the image graph represent pixels of a camera image; perform a first diffusion of labels on the image graph using sparse labels from a point cloud sensor to generate propagated labels; apply inpainting to one or more regions of the camera image to generate inpainted labels; perform a second diffusion of labels on the image graph to update the propagated labels; and fuse the propagated labels and the inpainted labels to generate dense semantic labels for the camera image.

In a further aspect, non-transitory computer-readable storage media comprising instructions, that when executed by processing circuitry of a computing system, cause the processing circuitry to construct an image graph where nodes of the image graph represent pixels of a camera image; perform a first diffusion of labels on the image graph using sparse labels from a point cloud sensor to generate propagated labels; apply inpainting to one or more regions of the camera image to generate inpainted labels; perform a second diffusion of labels on the image graph to update the propagated labels; and fuse the propagated labels and the inpainted labels to generate dense semantic labels for the camera image.

The details of one or more examples are set forth in the accompanying drawings and the description below. Other features, objects, and advantages will be apparent from the description, drawings, and claims.

DETAILED DESCRIPTION

An ADAS uses multiple types of sensors and software to help vehicles avoid hazardous situations to ensure safety and reliability. Sensors provide information about the real world surrounding the vehicle. Successful performance of tasks such as three-dimensional (3D) object detection and segmentation on this information is beneficial for accurate multimodal perception by the ADAS. However, point cloud labels generated from LIDAR sensors are inherently sparse, sometimes lacking an optimal level of coverage for performance of precise segmentation tasks. The techniques of this disclosure address this challenge by automatically generating semantic labels for multimodal input data using diffusion and iterative inpainting. The techniques described herein may enhance the accuracy and reliability of object detection in the context of autonomous driving applications. This may result in a safer autonomous driving experience. These techniques may also be used in other multimodal sensing contexts, such as robotics, aeronautics, manufacturing, or other image processing applications.

Figure 1:
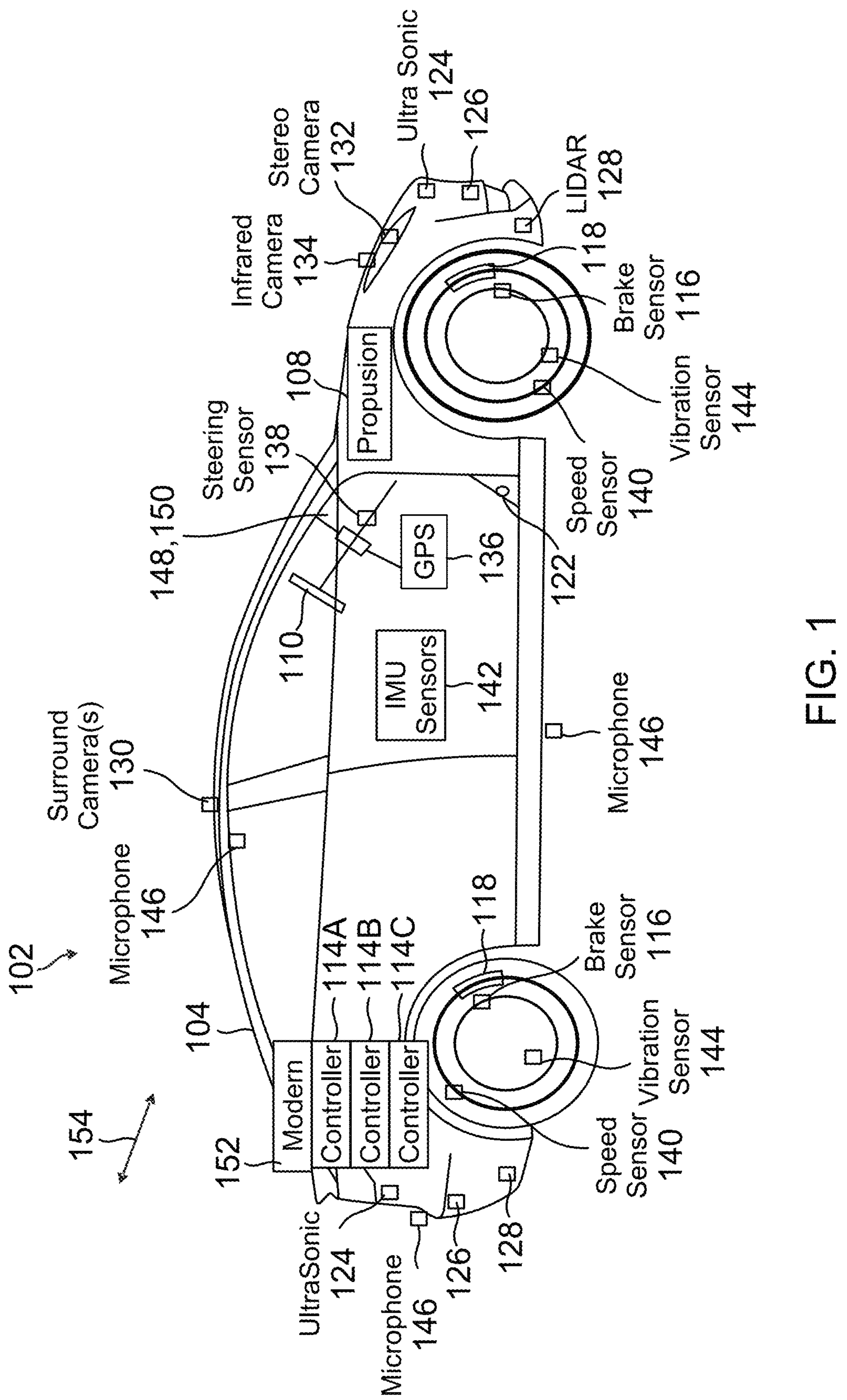
FIG. 1 is a diagram of an example autonomous vehicle, in accordance with the techniques of this disclosure.

FIG. 1 is a diagram of an example autonomous vehicle, in accordance with the techniques of this disclosure. Autonomous vehicle 102 in the example shown may comprise any vehicle (such as a car or truck) that can accommodate a human driver and/or human passengers. Autonomous vehicle 102 may include a vehicle body 104 suspended on a chassis, in this example comprised of four wheels and associated axles. A propulsion system 108, such as an internal combustion engine, hybrid electric power plant, or even all-electric engine, may be connected to drive some or all the wheels via a drive train, which may include a transmission (not shown). A steering wheel 110 may be used to steer some or all the wheels to direct autonomous vehicle 102 along a desired path when the propulsion system 108 is operating and engaged to propel the autonomous vehicle 102. Steering wheel 110 or the like may be optional for Level 5 implementations. One or more controllers 114A-114C (a controller 114) may provide autonomous capabilities in response to signals continuously provided in real-time from an array of sensors, as described more fully below.

Each controller 114 may be one or more onboard computer systems that may be configured to perform deep learning and AI functionality and output autonomous operation commands to self-drive autonomous vehicle 102 and/or assist the human vehicle driver in driving. Each vehicle may have any number of distinct controllers for functional safety and additional features. For example, controller 114A may serve as the primary computer for autonomous driving functions, controller 114B may serve as a secondary computer for functional safety functions, controller 114C may provide AI functionality for in-camera sensors, and controller 114 (D (not shown in FIG. 1) may provide infotainment functionality and provide additional redundancy for emergency situations.

Controller 114 may send command signals to operate vehicle brakes (using brake sensor 116) via one or more braking actuators 118, operate steering mechanism via a steering actuator, and operate propulsion system 108 which also receives an accelerator/throttle actuation signal 122. Actuation may be performed by methods known to persons of ordinary skill in the art, with signals typically sent via the Controller Area Network data interface ("CAN bus"), a network inside modern vehicles used to control brakes, acceleration, steering, windshield wipers, and the like. The CAN bus may be configured to have dozens of nodes, each with its own unique identifier (CAN ID). The bus may be read to find steering wheel angle, ground speed, engine revolutions per minute (RPM), button positions, and other vehicle status indicators. The functional safety level for a CAN bus interface is typically Automotive Safety Integrity Level (ASIL) B. Other protocols may be used for communicating within a vehicle, including FlexRay and Ethernet.

In an aspect, an actuation controller may be provided with dedicated hardware and software, allowing control of throttle, brake, steering, and shifting. The hardware may provide a bridge between the vehicle's CAN bus and the controller 114, forwarding vehicle data to controller 114 including the turn signals, wheel speed, acceleration, pitch, roll, yaw, Global Positioning System (GPS) data, tire pressure, fuel level, sonar, brake torque, and others. Similar actuation controllers may be configured for any make and type of vehicle, including special-purpose patrol and security cars, robo-taxis, long-haul trucks including tractor-trailer configurations, tiller trucks, agricultural vehicles, industrial vehicles, and buses.

Controller 114 may provide autonomous driving outputs in response to an array of sensor inputs including, for example, one or more ultrasonic sensors 124, one or more radio detection and ranging (RADAR) sensors 126, one or more Light Detection and Ranging ("LIDAR") sensors 128, one or more surround cameras 130 (typically such cameras are located at various places on vehicle body 104 to image areas all around the vehicle body), one or more stereo cameras 132 (in an aspect, at least one such stereo camera may face forward to provide object recognition in the vehicle's path), one or more infrared cameras 134, GPS unit 136 that provides location coordinates, a steering sensor 138 that detects the steering angle, speed sensors 140 (one for each of the wheels), an inertial sensor or inertial measurement unit (IMU) 142 that monitors movement of vehicle body 104 (this sensor may be, for example, an accelerometer(s) and/or a gyro-sensor(s) and/or a magnetic compass(es)), tire vibration sensors 144, and microphones 146 placed around and inside the vehicle. Other sensors may also be used.

Controller 114 may also receive inputs from an instrument cluster 148 and may provide human-perceptible outputs to a human operator via human-machine interface (HMI)qj display(s) 150, an audible annunciator, a loudspeaker and/or other means. In addition to traditional information such as velocity, time, and other well-known information, HMI display may provide the vehicle occupants with information regarding maps and vehicle's location, the location of other vehicles (including an occupancy grid) and even the controller's identification of objects and status. For example, HMI display 150 may alert the passenger when the controller has identified the presence of a water puddle, stop sign, caution sign, or changing traffic light and is taking appropriate action, giving the vehicle occupants peace of mind that the controller is functioning as intended. In an aspect, instrument cluster 148 may include a separate controller/processor configured to perform deep learning and AI functionality.

Autonomous vehicle 102 may collect data that is preferably used to help train and refine the neural networks used for autonomous driving. The autonomous vehicle 102 may include modem 152, preferably a system-on-a-chip (SoC) that provides modulation and demodulation functionality and allows the controller 114 to communicate over the wireless network 154. Modem 152 may include a radio frequency (RF) front-end for up-conversion from baseband to RF, and down-conversion from RF to baseband, as is known in the art. Frequency conversion may be achieved either through known direct-conversion processes (direct from baseband to RF and vice-versa) or through super-heterodyne processes, as is known in the art. Alternatively, such RF front-end functionality may be provided by a separate chip. Modem 152 preferably includes wireless functionality substantially compliant with one or more wireless protocols such as, without limitation: long term evolution (LTE), wideband code division multiple access (WCDMA), universal mobile telecommunications framework (UMTS), global system for mobile communications (GSM), CDMA2000, or other known and widely used wireless protocols.

It should be noted that, compared to sonar and RADAR sensors 126, cameras 130 may generate a richer set of features at a fraction of the cost. Thus, autonomous vehicle 102 may include a plurality of cameras 130-134, capturing images around the entire periphery of the autonomous vehicle 102. Camera type and lens selection depends on the nature and type of function. The autonomous vehicle 102 may have a mix of camera types and lenses to provide complete coverage around the autonomous vehicle 102; in general, narrow lenses do not have a wide field of view but can see farther. All camera locations on the autonomous vehicle 102 may support interfaces such as Gigabit Multimedia Serial link (GMSL) and Gigabit Ethernet.

In an aspect, a controller 114 may receive one or more images acquired by a plurality of cameras 130-134. Controller 114 may include a portion of an ADAS (such as ADAS 203 of FIG. 2) to perform automatic dense semantic label generation, by camera guided diffusion model with iterative inpainting 204 of FIG. 2 as described below, in accordance with the techniques of this disclosure. In an aspect, controller 114, executing ADAS 203 with camera guided diffusion model with iterative inpainting 204, may be configured to analyze one or more camera images from at least one of surround cameras 130 and stereo camera 132, and one or more LIDAR images from one or more LIDAR sensors 128, and automatically generate dense semantic labels for one or more objects detected in the one or more camera images. The automatically generated dense semantic labels generated by this automated semantic segmentation performed by controller 114 may be used by one or more of the controllers 114A, 114B, 114C to perform additional ADAS tasks to operate autonomous vehicle 102.

Automated semantic segmentation may be useful for at least several types of image analysis in the automotive context. For road segmentation, ADAS 203, including camera guided diffusion model with iterative inpainting 204, may identify the boundaries of the road, lane markings, sidewalks, etc. This allows autonomous vehicle 102 to understand where the vehicle can and cannot drive. Semantic segmentation may be used to distinguish between drivable surfaces and non-drivable ones. For object detection, ADAS 203, including camera guided diffusion model with iterative inpainting 204, may detect other vehicles, pedestrians, traffic signs, lights, etc. and classify them. This allows autonomous vehicle 102 to understand the environment around the vehicle and react appropriately by braking, changing lanes, etc. For free space estimation, ADAS 203, including camera guided diffusion model with iterative inpainting 204, may provide an understanding of the drivable free space around autonomous vehicle 102 using semantics. This allows planning motions and trajectories for the vehicle. For high definition (HD) mapping, ADAS 203, including camera guided diffusion model with iterative inpainting 204, provides semantic segmentation which may help build highly detailed maps for self-driving vehicles to locate themselves precisely. These include landmarks like roads, lane markings, signs, etc. For weather detection, ADAS 203, including camera guided diffusion model with iterative inpainting 204, may identifying rain, snow, fog, etc., conditions from camera inputs using semantics. This allows autonomous vehicle 102 to adjust the vehicle's driving style according to the weather. For change detection, ADAS 203, including camera guided diffusion model with iterative inpainting 204, may detect changes in the road conditions like road works, accidents, etc. by comparing temporally different semantic segmentation outputs. This provides updated scene understanding. An advantage of using semantics as described herein (as compared to bounding boxes) is that automated semantic segmentation provides an understanding of the entire scene and the spatial relationships between different components. This contextual understanding is advantageous for making safe autonomous driving decisions.

Figure 2:
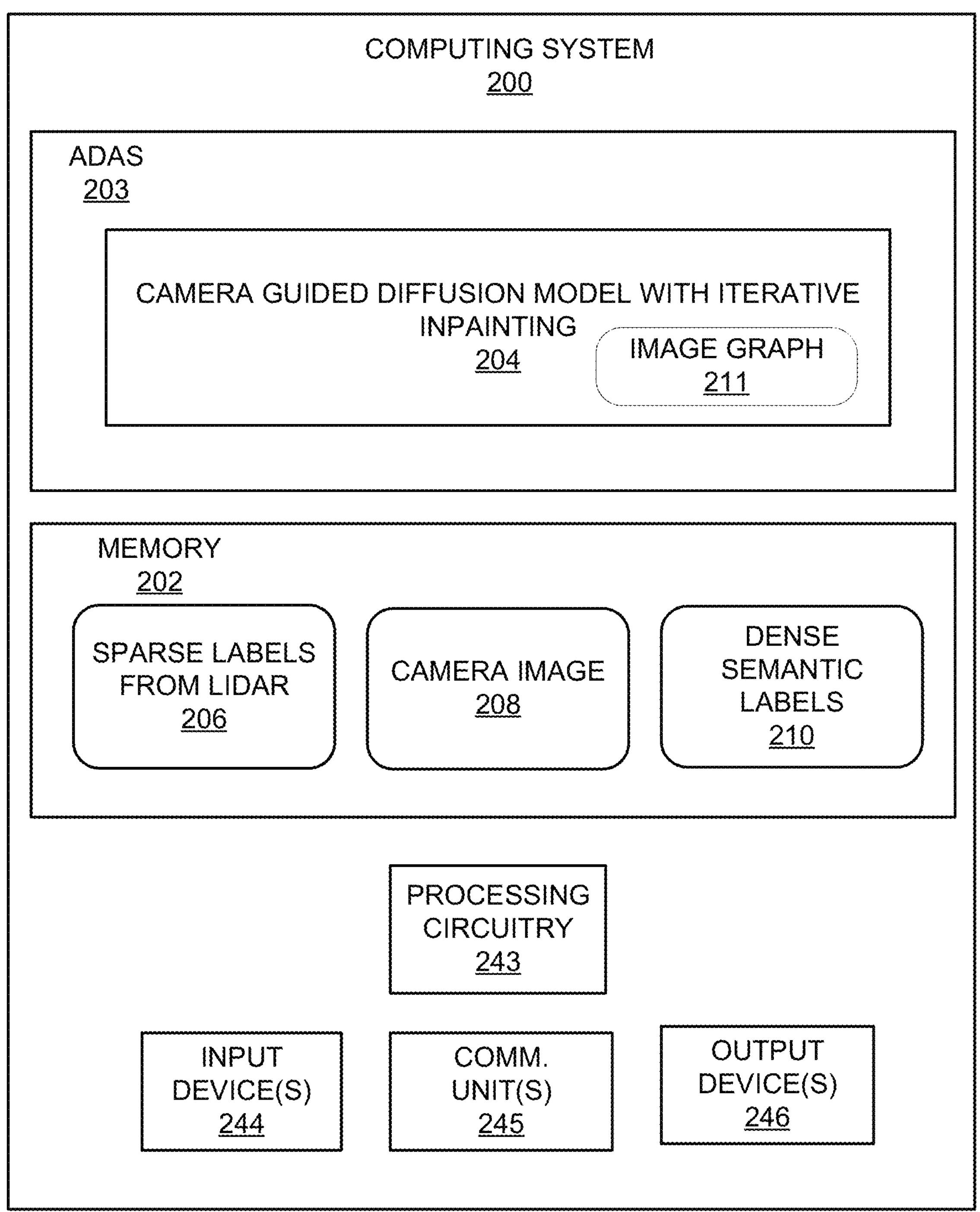
FIG. 2 is a block diagram illustrating an example computing system that may perform the techniques of this disclosure.

FIG. 2 is a block diagram illustrating an example computing system that may perform the techniques of this disclosure. As shown, computing system 200 comprises processing circuitry 243 and memory 202 for executing ADAS 203, which may represent an example instance of any controller 114 described in this disclosure, such as controller 114 of FIG. 1. In an aspect, ADAS 203 may include camera guided diffusion model with iterative inpainting 204. Camera guided diffusion model with iterative inpainting 204 may include various types of neural networks, such as, but not limited to, recursive neural networks (RNNs), convolutional neural networks (CNNs), and deep neural networks (DNNs). Camera guided diffusion model with iterative inpainting 204 automatically generates, based at least in part on data received from one or more of IMU sensors 142, GPS unit 136, surround camera(s) 130, infrared camera 134, stereo camera 132, LIDAR 128, and one or more ultrasonic sensors 124, dense semantic labels for objects detected in camera images and/or LIDAR images. In an aspect, camera guided diffusion model with iterative inpainting 204 analyzes sparse labels from LIDAR 206 and camera image 208 to automatically generate dense semantic labels 210 for objects detected in images from LIDAR 128 and/or camera image 208. In an aspect, camera guided diffusion model with iterative inpainting 204 builds image graph 211 for iterative propagation of labels.

Computing system 200 may be implemented as any suitable external computing system accessible by controller 114, such as one or more server computers, workstations, laptops, mainframes, appliances, embedded computing systems, cloud computing systems, High-Performance Computing (HPC) systems (i.e., supercomputing systems) and/or other computing systems that may be capable of performing operations and/or functions described in accordance with one or more aspects of the present disclosure. In some examples, computing system 200 may represent a cloud computing system, server farm, and/or server cluster (or portion thereof) that provides services to client devices and other devices or systems. In other examples, computing system 200 may represent or be implemented through one or more virtualized compute instances (e.g., virtual machines, containers, etc.) of a data center, cloud computing system, server farm, and/or server cluster. In an aspect, computing system 200 is disposed in autonomous vehicle 102. In other aspects, computing system 200 may be disposed in a robot, an airplane, a drone, a ship, or any other object making use of image processing and/or machine learning capabilities.

The techniques described in this disclosure may be implemented, at least in part, in hardware, software, firmware or any combination thereof. For example, various aspects of the described techniques may be implemented within processing circuitry 243 of computing system 200, which may include one or more of a microprocessor, a controller, a digital signal processor (DSP), an application specific integrated circuit (ASIC), a field-programmable gate array (FPGA), or equivalent discrete or integrated logic circuitry, or other types of processing circuitry. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

In another example, computing system 200 comprises any suitable computing system having one or more computing devices, such as desktop computers, laptop computers, gaming consoles, smart televisions, handheld devices, tablets, mobile telephones, smartphones, etc. In some examples, at least a portion of computing system 200 is distributed across a cloud computing system, a data center, or across a network, such as the Internet, another public or private communications network, for instance, broadband, cellular, Wi-Fi, ZigBee, Bluetooth® (or other personal area network-PAN), Near-Field Communication (NFC), ultrawideband, satellite, enterprise, service provider and/or other types of communication networks, for transmitting data between computing systems, servers, and computing devices.

Memory 202 may comprise one or more storage devices. One or more components of computing system 200 (e.g., processing circuitry 243, memory 202, etc.) may be interconnected to enable inter-component communications (physically, communicatively, and/or operatively). In some examples, such connectivity may be provided by a system bus, a network connection, an inter-process communication data structure, local area network, wide area network, or any other method for communicating data. Processing circuitry 243 of computing system 200 may implement functionality and/or execute instructions associated with computing system 200. Examples of processing circuitry 243 include microprocessors, application processors, display controllers, auxiliary processors, one or more sensor hubs, and any other hardware configured to function as a processor, a processing unit, or a processing device. Computing system 200 may use processing circuitry 243 to perform operations in accordance with one or more aspects of the present disclosure using software, hardware, firmware, or a mixture of hardware, software, and firmware residing in and/or executing at computing system 200. The one or more storage devices of memory 202 may be distributed among multiple devices.

Memory 202 may store information for processing during operation of computing system 200. In some examples, memory 202 comprises temporary memories, meaning that a primary purpose of the one or more storage devices of memory 202 is not long-term storage. Memory 202 may be configured for short-term storage of information as volatile memory and therefore not retain stored contents if deactivated. Examples of volatile memories include random-access memories (RAM), dynamic random-access memories (DRAM), static random-access memories (SRAM), and other forms of volatile memories known in the art. Memory 202, in some examples, may also include one or more computer-readable storage media. Memory 202 may be configured to store larger amounts of information than volatile memory. Memory 202 may further be configured for long-term storage of information as non-volatile memory space and retain information after activate/off cycles. Examples of non-volatile memories include magnetic hard disks, optical discs, Flash memories, or forms of electrically programmable read only memories (EPROM) or electrically erasable and programmable (EEPROM) read only memories.

Memory 202 may store program instructions and/or data associated with one or more of the modules described in accordance with one or more aspects of this disclosure. For example, memory 202 may store LIDAR images from LIDAR 128, 3D LIDAR point cloud segmentation labels from LIDAR 128, sparse labels from LIDAR images 206, stereo camera output data as one or more camera images 208 received from stereo camera 132, and dense semantic labels 210, as well as instructions and/or data structures of ADAS 203, including camera guided diffusion model with iterative inpainting 204 and image graph 211.

Processing circuitry 243 and memory 202 may provide an operating environment or platform for one or more modules or units (e.g., ADAS 203, including camera guided diffusion model with iterative inpainting 204, etc.), which may be implemented as software, but may in some examples include any combination of hardware, firmware, and software. Processing circuitry 243 may execute instructions and the one or more storage devices, e.g., memory 202, may store instructions and/or data of one or more modules. The combination of processing circuitry 243 and memory 202 may retrieve, store, and/or execute the instructions and/or data of one or more applications, modules, or software. The processing circuitry 243 and/or memory 202 may also be operably coupled to one or more other software and/or hardware components, including, but not limited to, one or more of the components illustrated in FIG. 2.

Processing circuitry 243 may execute ADAS 203, including camera guided diffusion model with iterative inpainting 204, using virtualization modules, such as a virtual machine or container executing on underlying hardware. One or more of such modules may execute as one or more services of an operating system or computing platform. Aspects of ADAS 203, including camera guided diffusion model with iterative inpainting 204, may execute as one or more executable programs at an application layer of a computing platform.

One or more input device(s) 244 of computing system 200 may generate, receive, or process input. Such input may include input from a keyboard, pointing device, voice responsive system, video camera, biometric detection/response system, button, sensor, mobile device, control pad, microphone, presence-sensitive screen, network, or any other type of device for detecting input from a human or machine.

One or more output device(s) 246 may generate, transmit, or process output. Examples of output are tactile, audio, visual, and/or video output. Output devices 246 may include a display, sound card, video graphics adapter card, speaker, presence-sensitive screen, one or more universal serial bus (USB) interfaces, video and/or audio output interfaces, or any other type of device capable of generating tactile, audio, video, or other output. Output devices 246 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, computing system 200 may include a presence-sensitive display that may serve as a user interface device that operates both as one or more input devices 244 and one or more output devices 246.

One or more communication units 245 of computing system 200 may communicate with devices external to computing system 200 (or among separate computing devices of computing system 200) by transmitting and/or receiving data, and may operate, in some respects, as both an input device and an output device. In some examples, communication units 245 may communicate with other devices over a network. In other examples, communication units 245 may send and/or receive radio signals on a radio network such as a cellular radio network. Examples of communication units 245 include a network interface card (e.g., such as an Ethernet card), an optical transceiver, a radio frequency transceiver, a GPS receiver, or any other type of device that can send and/or receive information. Other examples of communication units 245 may include Bluetooth®, GPS, 3G, 4G, 5G and Wi-Fi® radios found in mobile devices as well as Universal Serial Bus (USB) controllers and the like.

Figure 3:
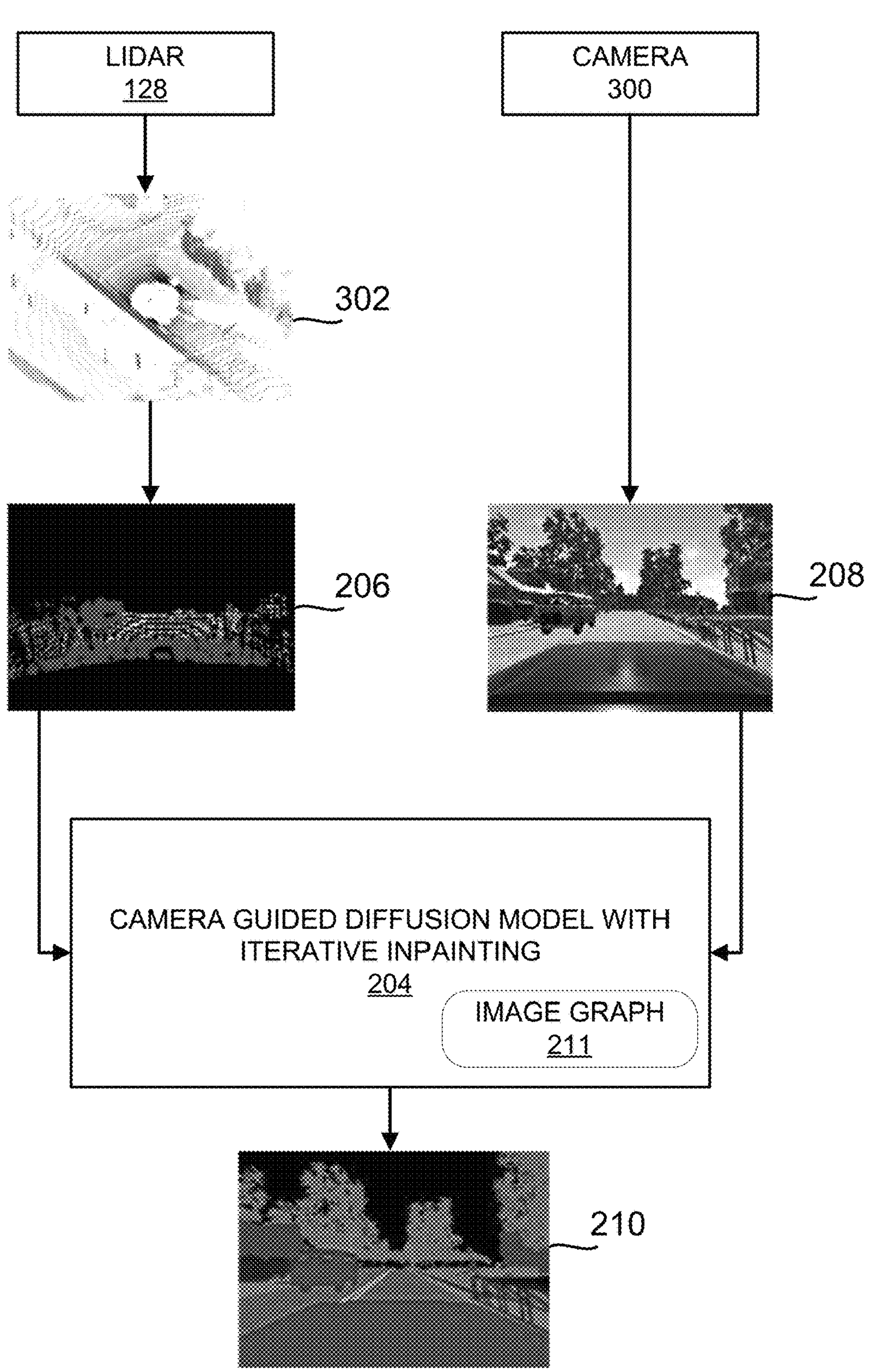
FIG. 3 illustrates example input data and output data of cross-modal dense semantic label generation processing in accordance with the techniques of this disclosure.

FIG. 3 illustrates example input data and output data of cross-modal dense semantic label generation processing in accordance with the techniques of this disclosure. LIDAR 128 generates an image representing 3D LIDAR point cloud segmentation labels 302 based at least in part on LIDAR sensed data. LIDAR 128 generates sparse labels from LIDAR 206 based at least in part on the image representing 3D LIDAR point cloud segmentation labels 302 and a projection of the 3D LIDAR point cloud segmentation labels to a two-dimensional (2D) representation. Thus, sparse labels from LIDAR 206 includes generated sparse labels from captured LIDAR images of a real-world scene at a moment in time in proximity of autonomous vehicle 102. In some examples, the real-world scene for LIDAR sensing may be in the front of autonomous vehicle 102, to the side of autonomous vehicle 102, or to the rear of autonomous vehicle 102. In other examples, sparse labels from LIDAR 206 may be formed from multiple sensed LIDAR images and may represent a birds-eye view of a real-world scene around autonomous vehicle 102.

Camera 300 is an instance of at least one of stereo camera 123 and surround camera 130. Camera 300 generates camera image 208, which may be a single image in a series of images (e.g., a video) captured by the camera. Thus, each camera image 208 is a captured image of a real-world scene at a moment in time in proximity of autonomous vehicle 102. In some examples, the real-world scene may be in the front of autonomous vehicle 102, to the side of autonomous vehicle 102, or to the rear of autonomous vehicle 102. In other examples, camera image 208 may be formed from multiple images and may represent a birds-eye view of a real-world scene around autonomous vehicle 102.

Sparse labels from LIDAR 206 and camera image 208 may be stored in memory 202 and accessed by ADAS 203 (including camera guided diffusion model with iterative inpainting 204). Camera guided diffusion model with iterative inpainting 204 analyzes one or more sparse labels from LIDAR 206 and one or more camera images 208, generates image graph 211, and generates one or more sets of dense semantic labels 210 for objects detected in the one or more camera images 208 of camera 300 and/or images from LIDAR 128.

Figure 4:
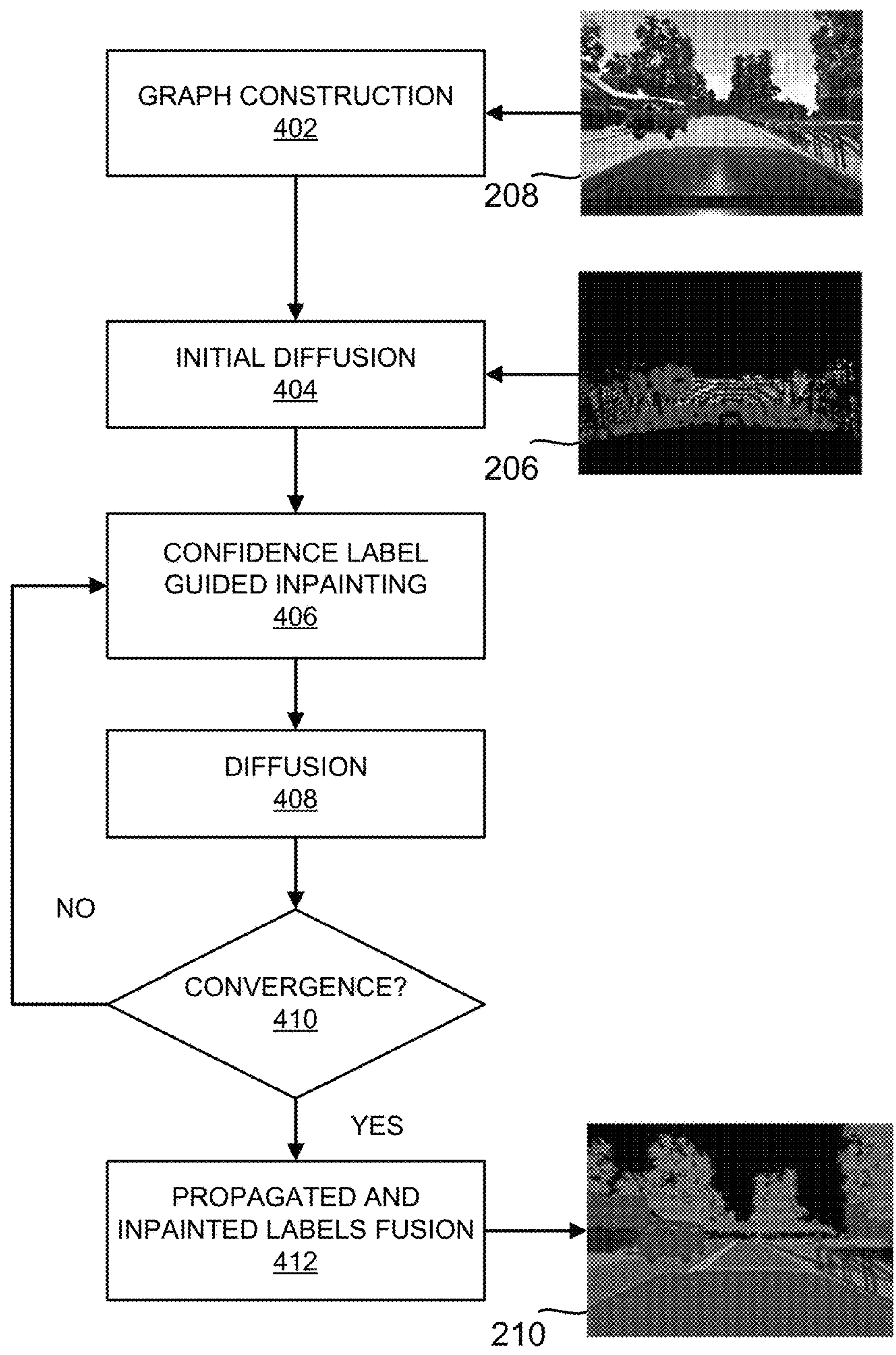
FIG. 4 illustrates cross-modal dense semantic label generation processing in accordance with the techniques of this disclosure.

FIG. 4 illustrates cross-modal dense semantic label generation processing in accordance with the techniques of this disclosure. FIG. 4 is provided for purposes of explanation and should not be considered limiting of the techniques as broadly exemplified and described in this disclosure. In an aspect, camera guided diffusion model with iterative inpainting 204 uses graph-based diffusion to propagate sparse LIDAR annotations to dense semantic (segmentation) labels for camera images. Camera guided diffusion model with iterative inpainting 204 begins by constructing image graph 211 using graph construction 402, where each node represents a pixel in the camera image. Graph construction 402 connects neighboring pixels using image graph edges and assigns weights based at least in part on proximity or visual similarity of the pixels. Initial diffusion 404 of camera guided diffusion model with iterative inpainting 204 performs an initial diffusion of labels on image graph 211 using the sparse labels from LIDAR 206 as seed values. The initial diffusion operation propagates labels of objects through the image graph edges and estimates confidence values for the propagated labels. The diffusion process considers both the initial seed values and the proximity or visual similarity between neighboring pixels.

Confidence label guided inpainting 406 of camera guided diffusion model with iterative inpainting 204 "inpaints" missing labels using labels with high confidence values (as determined by initial diffusion 404). During label propagation, each pixel is assigned a confidence value indicating the reliability of its propagated label. Pixels receiving labels directly from sparse LIDAR annotations have higher confidence values. These high confidence labels are then used to guide the inpainting process for filling in missing regions, as they represent reliable semantic information to propagate.

To summarize, high confidence labels refer to pixels that have directly inherited labels from the sparse LIDAR annotations during propagation. These labels are considered more reliable than those propagated across multiple edges. The inpainting process utilizes these high confidence labels as anchors to fill in the missing regions in a semantically consistent manner.

Diffusion 408 of camera guided diffusion model with iterative inpainting 204 performs diffusion operations of labels on image graph 211. If camera guided diffusion model with iterative inpainting 204 determines at block 410 that a convergence of the labels has not yet been achieved, camera guided diffusion model with iterative inpainting 204 repeats confidence label guided inpainting 406 and diffusion 408 operations. If camera guided diffusion model with iterative inpainting 204 determines at block 410 that a convergence of the labels has been achieved, propagated and inpainted labels fusion 412 of camera guided diffusion model with iterative inpainting 204 fuses the propagated and inpainted labels, based at least in part on the confidence values of the labels, into dense semantic labels 210. Thus, techniques of this disclosure leverage the sparse LIDAR labels to propagate label information through image graph 211, while using inpainting techniques to fill in missing regions. This iterative refinement and confidence-weighted fusion of propagation and inpainting improves coherence and accuracy over prior approaches. The techniques of the disclosure provide for propagating the reliable LIDAR labels to dense pixel-level segmentation labels, while overcoming sparsity, using image-guided inpainting.

In an aspect, graph construction 402 constructs image graph 211 as follows. Graph construction 402 denotes the camera image 208 as I, where each pixel of camera image 208 is represented by I(i,j) with (i,j) being the pixel coordinates. Graph construction 402 connects neighboring pixels and assigns weights based on proximity or visual similarity. To connect neighboring pixels, graph construction 402 defines a neighborhood function N(i,j) that returns the set of neighboring pixels for a given pixel (i,j). This may be achieved by considering 4-connectivity or 8-connectivity, depending on the desired adjacency criteria. For 4-connectivity, the neighborhood function N(i,j) returns the set of four neighboring pixels according to Equation 1.

$$N(i, j) = (i-1, j), (i+1, j), (i, j-1), (i, j+1) \quad \text{Equation 1}$$

For 8-connectivity, the neighborhood function N(i,j) returns the set of eight neighboring pixels according to Equation 2.

$$N(i, j) = (i-1, j-1), (i-1, j), (i-1, j+1), (i, j-1), (i, j+1), (i+1, j-1), (i+1, j), (i+1, j+1). \quad \text{Equation 2}$$

Next, graph construction 402 assigns weights based on proximity or visual similarity. In an aspect, for proximity-based weights, the weight W between pixel (i,j) and its neighbor (i',j') may be computed by graph construction 402 using the Euclidean distance between their coordinates as shown in Equation 3.

$$W(i, j, i', j') = \exp\left(-\frac{(i-i')^2 + (j-j')^2}{2\sigma^2}\right) \quad \text{Equation 3}$$

where $\sigma$ is a parameter controlling the spatial proximity influence.

In an aspect, using proximity-based weights may yield more accurate labels for images generated by extended reality (XR), virtual reality (VR) and/or augmented reality (AR) applications.

In an aspect, for visual similarity-based weights, the weight between pixel (i,j) and its neighbor (i',j') may be computed by graph construction 402 based at least in part on the visual similarity of their color values as shown in Equation 4.

$$W(i, j, i', j') = \exp\left(-\frac{|I(i, j) - I(i', j')|^2}{2\sigma_c^2}\right) \quad \text{Equation 4}$$

where I(i,j) denotes the color value of pixel (i,j) in the camera image, and $\sigma_c$ is a parameter controlling the visual similarity influence.

In another aspect, the weight computation may be extended by graph construction 402 to consider other visual characteristics, such as texture similarity, gradient similarity, or higher-level features, depending on the requirements of the segmentation task.

By constructing the image graph 211 with connectivity between pixels and assigning weights based on one of proximity or visual similarity, graph construction 402 establishes the foundation for the subsequent diffusion process that propagates labels through the graph edges. The specific weight computation method and parameters used may vary depending on the specific implementation and desired results.

In an aspect, initial diffusion 404 performs an initial diffusion of labels on the image graph 211 using the sparse labels from LIDAR 206 as initial seed values as follows. The diffusion process propagates the labels from the initial seeds to neighboring pixels through the image graph, considering both the initial seed values and the proximity or visual similarity between neighboring pixels. For seed initialization, initial diffusion 404 sets L(i,j) to denote the initial label value for pixel (i,j). Initial diffusion 404 initializes label value L(i,j) with one of the sparse LIDAR annotations (e.g., sparse labels from LIDAR 206), if available. For pixels without LIDAR annotations, initial diffusion 404 sets the label values of these pixels to an initial value, such as 0 or a background label. Initial diffusion 404 iterates through image graph 211 to propagate labels from the initial seeds to neighboring pixels. Initial diffusion 404 determines the updated label value $L_{propagated}$(i,j) for each pixel (i,j) using the diffusion equation of Equation 5.

$$L_{propagated}(i, j) = \frac{\sum_{n \in N(i,j)} W(i, j, n) \cdot L(i, j)}{\sum_{n \in N(i,j)} W(i, j, n)} \quad \text{Equation 5}$$

where L(i,j) represents the label value at pixel (i,j), W(i,j,n) is the weight between pixel (i,j) and its neighbor n, and N(i,j) is the set of neighboring pixels.

Initial diffusion 404 continues iterating through image graph 211, updating the label values using Equation 5, until the label values converge, or a specified number of iterations is reached. The convergence criterion may be defined based on the changes in label values between iterations. The diffusion process allows the initial seed values from the LIDAR annotations to propagate through image graph 211, influencing the label values of neighboring pixels. By considering both the initial seed values and the visual similarity between neighboring pixels, the diffusion process refines the label values to achieve a more accurate and dense semantic segmentation.

During the diffusion process, labels are propagated from the LIDAR annotations to unlabeled pixels in camera image 208. Simultaneously, the confidence or reliability of the propagated labels may be estimated to assess the quality of the labeling process. Confidence estimation helps assess the certainty associated with the propagated labels. During the diffusion process, each pixel (i,j) accumulates label probabilities from its neighbors. The confidence or reliability of the propagated label for pixel (i,j) may be denoted as C(i,j). Initial diffusion 404 initializes C(i,j) to 0 for all pixels. Initial diffusion 404 updates the confidence values for each pixel (i,j) during each diffusion iteration using the label probabilities from neighboring pixels as shown in Equation 6.

$$C_{new}(i, j) = C(i, j) + \sum_{n \in N(i,j)} W(i, j, n) \cdot C(n) \quad \text{Equation 6}$$

where $C_{new}$(i,j) represents the updated confidence value for pixel (i,j), C(n) denotes the confidence value of the neighboring pixel n, and W(i,j,n) is the weight between pixel (i,j) and its neighbor n.

Initial diffusion 404 repeats the confidence updates by iterating through image graph 211, updating the confidence values based on the label probabilities from neighboring pixels during each diffusion iteration. Application of label propagation Equation 5 propagates labels from the sparse LIDAR annotations to the unlabeled pixels, while application of confidence estimation Equation 6 accumulates and updates the confidence values during the diffusion process. Together, Equations 5 and 6 facilitate the diffusion-based labeling process and provide insights into the reliability and certainty of the propagated labels.

In an aspect, confidence label guided inpainting 406 inpaints missing labels using labels with high confidence values as follows. Based on the confidence estimation values for pixels, confidence label guided inpainting 406 identifies regions in camera image 208 where labels are missing or deemed unreliable (e.g., based on the confidence estimation values). Confidence label guided inpainting 406 may set a binary mask M(i,j) where M(i,j)=1 indicates a missing or unreliable label region, and M(i,j)=0 indicates a valid and reliable label region.

Next, confidence label guided inpainting 406 may set a predetermined confidence threshold value T to distinguish between confident and unreliable labels. Pixels with confidence values below the threshold value T may be considered unreliable and may be marked as missing in the binary mask as shown in Equation 7.

$$M(i, j) = 1, \text{ if } C(i, j) < T \text{ and } 0, \text{ otherwise,} \quad \text{Equation 7}$$

where C(i,j) represents the confidence value for pixel (i,j) and T is the confidence threshold.

In an aspect, confidence label guided inpainting 406 applies a selected inpainting process, such as texture synthesis or, for example, the process described in "PatchMatch: A Randomized Correspondence Algorithm for Structural Image Editing" by C. Barnes, et al., Association for Computing Machinery (ACM) Transactions on Graphics, Proceedings of SIGGRAPH, August 2009, to generate label completions for the missing regions. Other inpainting processes may also be used. Confidence label guided inpainting 406 incorporates LIDAR guidance and contextual information during the inpainting process to ensure coherent and plausible label completions. This can be achieved by incorporating LIDAR annotations as a guidance signal or by considering the global and local context within the image during the inpainting process.

Confidence label guided inpainting 406 may set $L_{inpainted}$ (i,j) to represent the inpainted label values for pixel (i,j). Confidence label guided inpainting 406 may update the label values (e.g., in a label matrix) for the missing or unreliable regions of camera image 208 using the inpainted label values as shown in Equation 8.

$$\underline{L}_{propagated}(i, j) = L_{inpainted}(i, j), \quad \text{Equation 8}$$

$$\text{if } M(i, j) = 1 \text{ and } L(i, j), \text{ otherwise,}$$

where $L_{propagated}$(i,j) represents the updated label value for pixel (i,j), L(i,j) is the initial label value, and $L_{inpainted}$(i,j) denotes the inpainted label value.

By identifying missing or unreliable label regions based on confidence estimation values, utilizing inpainting techniques with LIDAR guidance and contextual information, and updating the label values accordingly, the techniques of the disclosure generate plausible and coherent label completions for camera image 208. Application of Equation 8 provides for filling in the missing label regions using the confident propagated labels and context-aware inpainting methods.

In an aspect, diffusion 408 performs diffusion of labels on image graph 211 as discussed above with respect to initial diffusion 404, except subsequent iterations of the diffusion process use labels already present in image graph 211 (as determined by initial diffusion 404 or an iteration of diffusion 408) instead of the initial seed values.

The iterative refinement process of confidence label guided inpainting 406 and diffusion 408 may be repeated until convergence is achieved. First, an initialization step for convergence performed by camera guided diffusion model with iterative inpainting 204 includes initializing a set of segmentation masks with initial label values, either obtained from the diffusion process or from an initial estimation. For iterative refinement, camera guided diffusion model with iterative inpainting 204 repeats the following until convergence is achieved or a specified number of iterations is reached. Diffusion 408 updates image graph 211 by incorporating the updated label values from the previous iteration (performed by diffusion 408) or the initial estimation (performed by initial diffusion 404). Diffusion 408 performs label propagation through the graph using the diffusion equation as shown in Equation 9.

$$L_{propagated}(i, j) = \frac{\sum_{n \in N(i,j)} W(i, j, n) \cdot L(n)}{\sum_{n \in N(i,j)} W(i, j, n)} \quad \text{Equation 9}$$

where $L_{propagated}$(i,j) represents the updated label value tor pixel (i,j), L(n) denotes the label value of the neighboring pixel n, and W(i,j,n) is the weight between pixel (i,j) and its neighbor n.

Confidence label guided inpainting 406 applies inpainting techniques, such as deep learning-based inpainting models or context-aware inpainting algorithms, to fill in the missing label regions using the updated label values.

Camera guided diffusion model with iterative inpainting 204 updates the segmentation masks with the results of the inpainting step, considering both the propagated labels and the inpainted label completions as shown in Equation 10.

$$SegMask_{new}(i, j) = \begin{cases} L_{new}(i, j), & \text{if } M(i, j) = 1 \\ L_{inpainted}(i, j), & \text{otherwise} \end{cases} \quad \text{Equation 10}$$

where $SegMask_{new}(i,j)$ represents the updated segmentation mask value for pixel (i,j), $L_{new}(i,j)$ denotes the updated label value, M(i,j) is the binary mask indicating missing or unreliable regions, and $L_{inpainted}(i,j)$ represents the inpainted label value.

As noted, camera guided diffusion model with iterative inpainting 204 repeats the iterative refinement process until convergence is achieved (at block 410) or a predefined convergence criterion is met. In various aspects, convergence may be determined based on the changes in label values, similarity between consecutive segmentation masks, or other implementation-specific convergence metrics.

In an aspect, propagated and inpainted labels fusion 412 fuses the propagated and inpainted labels, based at least in part on the confidence estimation values of the labels, into dense semantic labels 210 as follows. Propagated and inpainted labels fusion 412 may update segmentation masks based on confidence-weighted fusion by combining the inpainted labels with the propagated labels based on their confidence estimate values. Propagated and inpainting labels fusion 412 may assign higher weights to the confident labels obtained through the diffusion process, and lower weights to the inpainted labels in uncertain regions. This confidence-weighted fusion ensures that reliable information from the LIDAR annotations is prioritized, while leveraging the inpainting results to fill in missing label regions. Propagated and inpainted labels fusion 412 may denote the propagated label values as $L_{propagated}(i,j)$ and the inpainted label values as $L_{inpainted}(i,j)$. Propagated and inpainted labels fusion 412 may set C(i,j) to represent the confidence value for each pixel (i,j), indicating the reliability or certainty of the propagated label. The confidence-weighted fusion combines the labels based on their confidence estimates as shown in Equation 11.

$$L_{segmask}(i, j) = (C(i, j) \cdot L_{propagated}(i, j)) + ((1 - C(i, j)) \cdot L_{inpainted}(i, j)) \quad \text{Equation 11}$$

where $L_{segmask}(i,j)$ represents the fused label value for pixel (i,j), C(i,j) is the confidence value for that pixel, $L_{propagated}(i,j)$ denotes the propagated label value, and $L_{inpainted}(i,j)$ represents the inpainted label value.

By applying confidence-weighted fusion Equation 11, the techniques of the disclosure combine the strengths of both the propagated labels and the inpainted labels, ensuring that reliable label information is prioritized while utilizing the inpainting results to fill in missing label regions. This fusion process helps create more accurate and coherent segmentation masks, leveraging the strengths of the diffusion-based labeling and inpainting techniques. In various aspects, this fusion process may be applied to either semantic segmentation or instant segmentation. Propagated and inpainted labels fusion 412 may return the combined labels of $L_{segmask}$ as dense semantic labels 210. Dense semantic labels 210 may then be used by ADAS 203 (or another application) for further processing (such as operation of autonomous vehicle 102).

Figure 5:
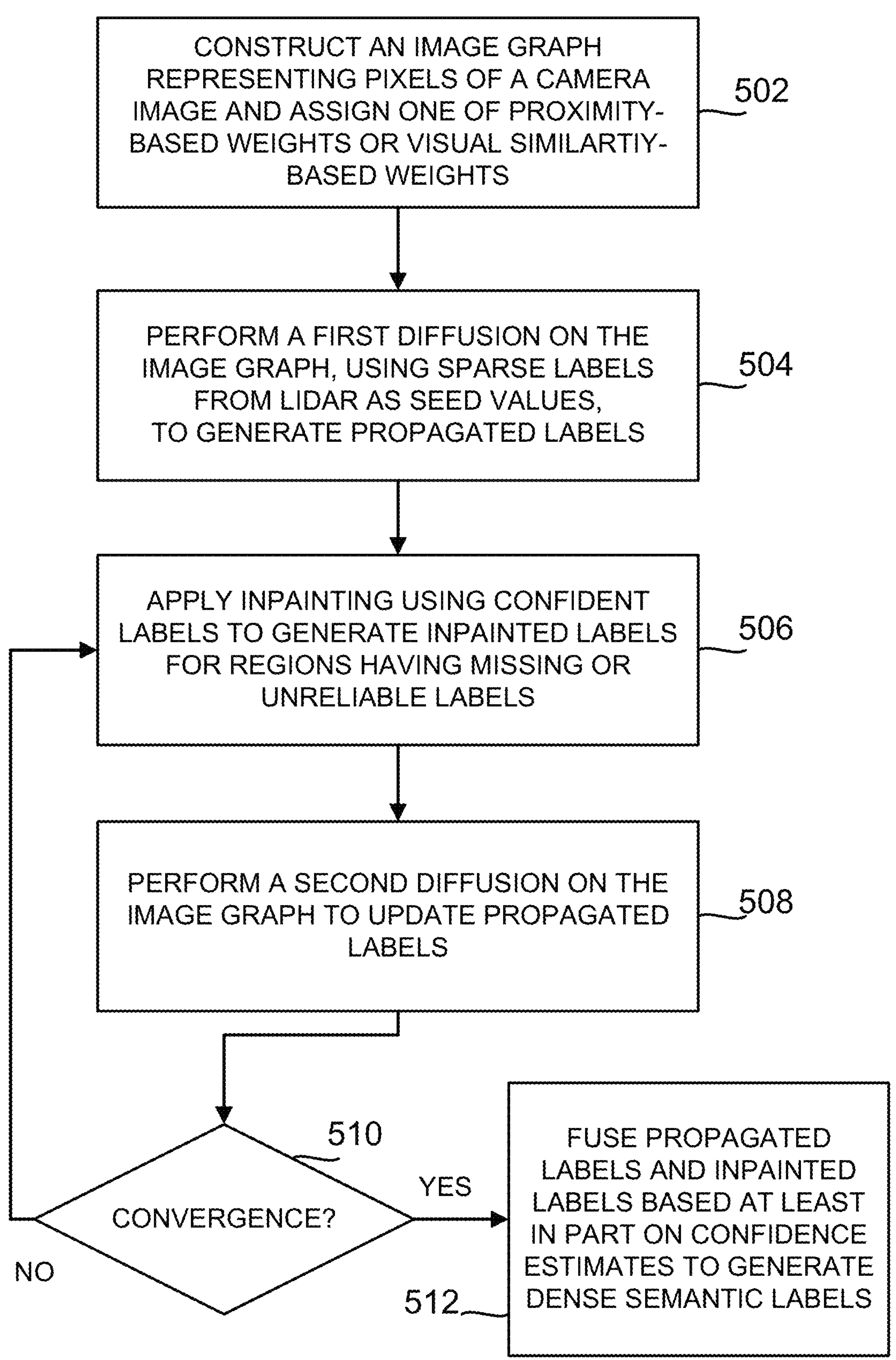
FIG. 5 is a flowchart illustrating an example method of cross-modal dense semantic label generation using diffusion and iterative inpainting in accordance with the techniques of this disclosure.

FIG. 5 is a flowchart illustrating an example method of cross-modal dense semantic label generation using diffusion and iterative inpainting in accordance with the techniques of this disclosure. Although described with respect to computing system 200 (FIG. 2), it should be understood that other computing devices may be configured to perform a method similar to that of FIG. 5.

At block 502, graph construction 402 of camera guided diffusion model with iterative inpainting 204 constructs image graph 211 whose nodes represent pixels of camera image 208 and assigns proximity-based weights or visual similarity-based weights to the nodes.

At block 504, initial diffusion 404 of camera guided diffusion model with iterative inpainting 204 performs a first diffusion on the image graph, using sparse labels from LIDAR 206 as seed values, to generate propagated labels.

At block 506, confidence label guided inpainting 406 of camera guided diffusion model with iterative inpainting 204 applying inpainting using confident labels to generate inpainting labels for regions of the camera image having missing or unreliable labels.

At block 508, diffusion 408 of camera guided diffusion model with iterative inpainting 204 performs a second diffusion on the image graph to update propagated labels.

At block 510, if convergence of the labels is not achieved, then blocks 506 and 508 may be repeated. At block 510, if convergence of the labels is achieved, then at block 512, propagated and inpainted labels fusion 412 of camera guided diffusion model with iterative inpainting 204 fuses the propagated labels and the inpainted labels based at least in part on the confidence estimates of labels to generate dense semantic labels 210.

Thus, camera guided diffusion model with iterative inpainting 204 provides at least the following technical benefits. Camera guided diffusion model with iterative inpainting 204 provides enhanced label propagation. The diffusion techniques disclosed herein may effectively propagate labels from sparse LIDAR annotations to unlabeled regions in the camera image 208. By incorporating inpainting, the missing label regions may be filled in using context-aware completions. This helps expand the coverage of labels, resulting in more comprehensive and accurate segmentation masks. Camera guided diffusion model with iterative inpainting 204 provides improved label quality and coherence. The inpainting techniques disclosed herein utilize the surrounding context and global information to generate visually plausible and coherent completions. By applying inpainting to the propagated labels, the labels in the missing regions are refined to align better with the surrounding context. This improves the overall quality and coherence of the generated segmentation masks. Camera guided diffusion model with iterative inpainting 204 handles uncertainty and incompleteness of labels. Sparse LIDAR annotations may introduce uncertainty or incomplete labeling. Inpainting can effectively fill in the missing label regions, reducing the impact of incomplete annotations and ensuring a more complete labeling of camera semantics. This helps mitigate the limitations imposed by the sparsity of LIDAR point cloud labels. Camera guided diffusion model with iterative inpainting 204 provides robustness to noisy LIDAR annotations. LIDAR annotations might contain noise or inaccuracies due to sensor limitations or occlusions. By combining diffusion and inpainting, the inpainting process can refine and smooth out noisy or inconsistent LIDAR annotations. This improves the robustness of the labeling process and reduces the influence of noisy annotations on the final segmentation masks. Finally, camera guided diffusion model with iterative inpainting 204 provides for integration of local and global contexts. The diffusion techniques disclosed herein capture the local context through the image graph 208 structure, while inpainting methods consider both local and global information for generating coherent completions. The combination of diffusion and inpainting leverages both local and global context to ensure consistent and contextually aware label propagation and inpainting results.

The following numbered clauses illustrate one or more aspects of the devices and techniques described in this disclosure.

Clause 1. A method including constructing, by a computing system, an image graph where nodes of the image graph represent pixels of a camera image; performing a first diffusion of labels on the image graph using sparse labels from a point cloud sensor to generate propagated labels; applying inpainting to one or more regions of the camera image to generate inpainted labels; performing a second diffusion of labels on the image graph to update the propagated labels; and fusing the propagated labels and the inpainted labels to generate dense semantic labels for the camera image.

Clause 2. The method of clause 1, further comprising repeating the inpainting and the second diffusion until a convergence of labels is achieved.

Clause 3. The method of clause 2, wherein fusing the propagated labels and the inpainted labels comprises updating segmentation masks for the pixels using the propagated labels and the inpainted labels.

Clause 4. The method of clause 3, further comprising determining convergence based at least in part on a similarity between consecutive segmentation masks.

Clause 5. The method of clause 1, wherein constructing the image graph further comprises assigning proximity-based weights to the pixels of the image graph.

Clause 6. The method of clause 1, wherein constructing the image graph further comprises assigning visual similarity-based weights to the pixels of the image graph.

Clause 7. The method of clause 1, wherein performing the first diffusion and the second diffusion comprises propagating labels of objects in the camera image through edges of the image graph to generate the propagated labels.

Clause 8. The method of clause 1, wherein performing the first diffusion and the second diffusion comprises estimating confidence values for the propagated labels.

Clause 9. The method of clause 8, wherein applying inpainting to the one or more regions further comprises applying inpainting to the one or more regions using labels with confidence values over a predetermined threshold value.

Clause 10. The method of clause 1, wherein the one or more regions comprise at least one of missing labels and unreliable labels.

Clause 11. The method of clause 1, further comprising sending the dense semantic labels to an advanced driver assistance system (ADAS) for operation of a vehicle.

Clause 12. The method of clause 11, wherein the camera image and the sparse labels from a light detection and ranging (LIDAR) point cloud sensor represent a real-world scene in proximity to the vehicle.

Clause 13. The method of clause 1, further comprising performing object detection based at least in part on the dense semantic labels.

Clause 14. An apparatus including a memory that stores instructions; and processing circuitry that executes the instructions to construct an image graph where nodes of the image graph represent pixels of a camera image; perform a first diffusion of labels on the image graph using sparse labels from a point cloud sensor to generate propagated labels; apply inpainting to one or more regions of the camera image to generate inpainted labels; perform a second diffusion of labels on the image graph to update the propagated labels; and fuse the propagated labels and the inpainted labels to generate dense semantic labels for the camera image.

Clause 15. The apparatus of clause 14, further including the processing circuitry to execute instructions to repeat the inpainting and the second diffusion until a convergence of labels is achieved.

Clause 16. The apparatus of clause 15, wherein instructions to fuse the propagated labels and the inpainted labels include instructions to update segmentation masks for the pixels using the propagated labels and the inpainted labels.

Clause 17. The apparatus of clause 16, further including instructions to determine convergence based at least in part on a similarity between consecutive segmentation masks.

Clause 18. The apparatus of clause 14, wherein instructions to construct the image graph further include instructions to assign proximity-based weights to the pixels of the image graph.

Clause 19. The apparatus of clause 14, wherein instructions to construct the image graph further comprise instructions assigning visual similarity-based weights to the pixels of the image graph.

Clause 20. Non-transitory computer-readable storage media including instructions, that when executed by processing circuitry of a computing system, cause the processing circuitry to construct an image graph where nodes of the image graph represent pixels of a camera image; perform a first diffusion of labels on the image graph using sparse labels from a point cloud sensor to generate propagated labels; apply inpainting to one or more regions of the camera image to generate inpainted labels; perform a second diffusion of labels on the image graph to update the propagated labels; and fuse the propagated labels and the inpainted labels to generate dense semantic labels for the camera image.

Clause 21. A computing system including means for performing any of the methods of Clauses 1 through 13.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of random-access memory (RAM), read-only memory (ROM), electrically erasable ROM (EEPROM), compact disc ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms “processor” and “processing circuitry,” as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:

constructing, by a computing system, an image graph where nodes of the image graph represent pixels of a camera image;

performing a first diffusion of labels on the image graph using sparse labels from a point cloud sensor to generate propagated labels;

applying inpainting to one or more regions of the camera image to generate inpainted labels;

performing a second diffusion of labels on the image graph to update the propagated labels;

fusing the propagated labels and the inpainted labels to generate dense semantic labels for the camera image, wherein fusing the propagated labels and the inpainted labels comprises updating segmentation masks for the pixels using the propagated labels and the inpainted labels; and repeating the inpainting and the second diffusion until a convergence of labels is achieved, wherein the convergence is determined based at least in part on a similarity between consecutive segmentation masks.

2. The method of claim 1, wherein constructing the image graph further comprises assigning proximity-based weights to the pixels of the image graph.

3. The method of claim 1, wherein constructing the image graph further comprises assigning visual similarity-based weights to the pixels of the image graph.

4. The method of claim 1, wherein performing the first diffusion and the second diffusion comprises propagating labels of objects in the camera image through edges of the image graph to generate the propagated labels.

5. The method of claim 1, wherein performing the first diffusion and the second diffusion comprises estimating confidence values for the propagated labels.

6. The method of claim 5, wherein applying inpainting to the one or more regions further comprises applying inpainting to the one or more regions using labels with confidence values over a predetermined threshold value.

7. The method of claim 1, wherein the one or more regions comprise at least one of missing labels and unreliable labels.

8. The method of claim 1, further comprising sending the dense semantic labels to an advanced driver assistance system (ADAS) for operation of a vehicle.

9. The method of claim 8, wherein the camera image and the sparse labels from a light detection and ranging (LIDAR) point cloud sensor represent a real-world scene in proximity to the vehicle.

10. The method of claim 1, further comprising performing object detection based at least in part on the dense semantic labels.

11. An apparatus comprising:

at least one memory; and processing circuitry in communication with the at least one memory, the processing circuitry configured to:

construct an image graph where nodes of the image graph represent pixels of a camera image;

perform a first diffusion of labels on the image graph using sparse labels from a point cloud sensor to generate propagated labels;

apply inpainting to one or more regions of the camera image to generate inpainted labels;

perform a second diffusion of labels on the image graph to update the propagated labels;

fuse the propagated labels and the inpainted labels to generate dense semantic labels for the camera image, wherein the processing circuitry configured to fuse the propagated labels and the inpainted labels is further configured to update segmentation masks for the pixels using the propagated labels and the inpainted labels; and repeat the inpainting and the second diffusion until a convergence of labels is achieved, wherein the processing circuitry configured to determine convergence is further configured to determine convergence based at least in part on a similarity between consecutive segmentation masks.

12. The apparatus of claim 11, wherein instructions to construct the image graph further comprise instructions to assign proximity-based weights to the pixels of the image graph.

13. The apparatus of claim 11, wherein instructions to construct the image graph further comprise instructions assigning visual similarity-based weights to the pixels of the image graph.

14. A non-transitory computer-readable medium storing instructions, that when executed by processing circuitry, cause the processing circuitry to:

construct an image graph where nodes of the image graph represent pixels of a camera image;

perform a first diffusion of labels on the image graph using sparse labels from a point cloud sensor to generate propagated labels;

apply inpainting to one or more regions of the camera image to generate inpainted labels;

perform a second diffusion of labels on the image graph to update the propagated labels;

fuse the propagated labels and the inpainted labels to generate dense semantic labels for the camera image, wherein the instructions to fuse the propagated labels and the inpainted labels further cause the processing circuitry to update segmentation masks for the pixels using the propagated labels and the inpainted labels; and repeat the inpainting and the second diffusion until a convergence of labels is achieved, wherein the instructions to determine convergence further cause the processing circuitry to determine convergence based at least in part on a similarity between consecutive segmentation masks.

* * * * *